US012592814B2

(12) United States Patent
Sarda

(10) Patent No.: US 12,592,814 B2
(45) Date of Patent: Mar. 31, 2026

(54) MAINTAINING A VIRTUAL TIME OF DAY

(71) Applicant: Skyworks Solutions, Inc., Irvine, CA (US)

(72) Inventor: Vivek Sarda, Austin, TX (US)

( * ) Notice: Subject to any disclaimer, the term of this patent is extended or adjusted under 35 U.S.C. 154(b) by 133 days.

(21) Appl. No.: 18/670,496

(22) Filed: May 21, 2024

(65) Prior Publication Data

US 2024/0430070 A1 Dec. 26, 2024

Related U.S. Application Data

(63) Continuation of application No. 17/956,457, filed on Sep. 29, 2022, now Pat. No. 12,021,960.

(60) Provisional application No. 63/347,788, filed on Jun. 1, 2022, provisional application No. 63/250,708, filed on Sep. 30, 2021.

(51) Int. Cl.
*H04L 7/00* (2006.01)
*H04L 43/10* (2022.01)

(52) U.S. Cl.
CPC .......... *H04L 7/0054* (2013.01); *H04L 7/0008* (2013.01); *H04L 43/10* (2013.01)

(58) Field of Classification Search
CPC ...... H04L 7/0054; H04L 7/0008; H04L 43/10
See application file for complete search history.

(56) References Cited

U.S. PATENT DOCUMENTS

| | | |
|---|---|---|
| 5,140,611 A | 8/1992 | Jones |
| 5,509,038 A | 4/1996 | Wicki |
| 5,644,604 A | 7/1997 | Larson |
| 5,964,880 A | 10/1999 | Liu |
| 6,549,046 B1 | 4/2003 | Klecka, III |
| 6,760,586 B1 | 7/2004 | Lee |
| 6,839,858 B1 | 1/2005 | James |
| 6,885,647 B1 | 4/2005 | Chung et al. |
| 7,002,996 B1 | 2/2006 | Dougherty et al. |
| 7,079,589 B1 | 7/2006 | Maksimovic |
| 7,116,743 B1 | 10/2006 | Wang |
| 7,203,227 B1 | 4/2007 | Currivan |
| 7,417,510 B2 | 8/2008 | Huang |

(Continued)

FOREIGN PATENT DOCUMENTS

| | | |
|---|---|---|
| CN | 102291233 A | 12/2011 |
| CN | 103684727 A | 3/2014 |

(Continued)

OTHER PUBLICATIONS

Broadcom Corp., "Ethernet Time Synchronization Providing—Native Timing Within the Network," White Paper, Oct. 2008, 36 pages.

(Continued)

*Primary Examiner* — Jaison Joseph
(74) *Attorney, Agent, or Firm* — Knobbe, Martens, Olson & Bear, LLP

(57) ABSTRACT

Time of day (ToD) registers provide respective virtual ToDs corresponding to the occurrence of edges of input clock signals being supplied to an integrated circuit. The integrated circuit generates a heartbeat clock signal having a frequency higher than a SYNC signal and time stamps the heartbeat clock signal to generate heartbeat time stamps. The heartbeat time stamps are used along with the time stamps of the input clock signals to determine the time of day corresponding to occurrences of edges of the input clock signals.

18 Claims, 8 Drawing Sheets

(56) References Cited

U.S. PATENT DOCUMENTS

| | | | |
|---|---|---|---|
| 7,451,337 B1 | 11/2008 | Hewitt | |
| 7,451,339 B2 | 11/2008 | Smith, Sr. | |
| 7,535,893 B1 | 5/2009 | Beladakere et al. | |
| 7,860,205 B1 | 12/2010 | Aweya et al. | |
| 7,903,681 B2 | 3/2011 | Roberts et al. | |
| 8,355,476 B2 | 1/2013 | Lee | |
| 8,942,561 B2 | 1/2015 | Boyd et al. | |
| 9,246,615 B2 | 1/2016 | Ellegard et al. | |
| 9,369,270 B1 | 6/2016 | Spijker | |
| 9,426,762 B2 | 8/2016 | Ehlers et al. | |
| 9,479,182 B1 | 10/2016 | Baidas | |
| 9,594,396 B2 | 3/2017 | Turner et al. | |
| 9,628,255 B1 | 4/2017 | Biadas | |
| 9,665,121 B2 | 5/2017 | Aweya | |
| 9,673,970 B1 | 6/2017 | Aweya et al. | |
| 9,860,004 B2 | 1/2018 | Joergensen | |
| 9,960,873 B2 | 5/2018 | Yang | |
| 10,007,639 B2 | 6/2018 | Mitric | |
| 10,067,478 B1 | 9/2018 | Kolar Ranganathan | |
| 10,075,284 B1* | 9/2018 | Rodrigues | H04J 3/0688 |
| 10,084,559 B1* | 9/2018 | Devineni | H04J 3/0661 |
| 10,158,444 B1 | 12/2018 | Darras | |
| 10,511,312 B1 | 12/2019 | Pastorello et al. | |
| 10,536,258 B2 | 1/2020 | Choo et al. | |
| 10,594,423 B1 | 3/2020 | Anand et al. | |
| 10,715,307 B1 | 7/2020 | Jin | |
| 10,727,845 B1 | 7/2020 | Balakrishnan | |
| 10,797,686 B1 | 10/2020 | Terstrup et al. | |
| 10,917,097 B1 | 2/2021 | Meyer et al. | |
| 10,951,216 B1 | 3/2021 | Barnette | |
| 11,061,432 B2 | 7/2021 | Sarda | |
| 11,088,816 B1* | 8/2021 | Sarda | H04J 3/0697 |
| 11,088,819 B1 | 8/2021 | Sarda | |
| 11,496,234 B2 | 11/2022 | Seethamraju | |
| 11,502,812 B1 | 11/2022 | Sarda | |
| 2006/0020733 A1 | 1/2006 | Sarda | |
| 2006/0280182 A1 | 12/2006 | Williams | |
| 2007/0046516 A1 | 3/2007 | Dombusch | |
| 2008/0080563 A1 | 4/2008 | Kataria | |
| 2008/0240169 A1 | 10/2008 | Cui et al. | |
| 2009/0024865 A1 | 1/2009 | Fugaro | |
| 2009/0100197 A1* | 4/2009 | Smith, Sr. | G06F 1/14 |
| | | | 709/248 |
| 2009/0168808 A1 | 7/2009 | Cho | |
| 2009/0251226 A1 | 10/2009 | Kathuria et al. | |
| 2010/0118894 A1 | 5/2010 | Awaya et al. | |
| 2011/0051754 A1* | 3/2011 | Lansdowne | H04J 3/0697 |
| | | | 370/503 |
| 2011/0296226 A1 | 12/2011 | Sorbara et al. | |
| 2012/0300795 A1 | 11/2012 | Joergensen | |
| 2012/0319734 A1 | 12/2012 | Nagaraj | |
| 2013/0121347 A1 | 5/2013 | Saito et al. | |
| 2013/0215910 A1* | 8/2013 | Inomata | H04J 3/0667 |
| | | | 370/503 |
| 2014/0068315 A1 | 3/2014 | Aweya et al. | |
| 2014/0320181 A1 | 10/2014 | Mitric | |
| 2015/0092797 A1 | 4/2015 | Aweya | |
| 2015/0185759 A1 | 7/2015 | Hinderer et al. | |
| 2015/0200770 A1 | 7/2015 | Rahbar et al. | |
| 2015/0207620 A1 | 7/2015 | Colby | |
| 2015/0222276 A1 | 8/2015 | Milijevic | |
| 2016/0170439 A1 | 6/2016 | Aweya | |
| 2016/0182217 A1 | 6/2016 | Hashizume | |
| 2017/0135053 A1 | 5/2017 | Shenoi et al. | |
| 2017/0288801 A1 | 10/2017 | Aweya | |
| 2017/0373824 A1 | 12/2017 | Mitchler | |
| 2019/0020333 A1 | 1/2019 | Koch et al. | |
| 2019/0036804 A1 | 1/2019 | Mihelic et al. | |
| 2019/0379474 A1 | 12/2019 | Coulter | |
| 2019/0379475 A1* | 12/2019 | Seethamraju | H04J 3/0667 |
| 2020/0021379 A1 | 1/2020 | Aweya | |
| 2020/0028666 A1 | 1/2020 | Goldin et al. | |
| 2020/0050575 A1 | 2/2020 | Mishra | |
| 2020/0127752 A1 | 4/2020 | Tai et al. | |
| 2020/0285265 A1* | 9/2020 | Ranganathan | G06F 1/06 |
| 2021/0157355 A1 | 5/2021 | Sarda et al. | |
| 2021/0297083 A1 | 9/2021 | Nichikawa | |
| 2021/0328758 A1* | 10/2021 | Sarda | H03L 7/08 |
| 2022/0209880 A1* | 6/2022 | Sarda | H04J 3/0605 |
| 2023/0095364 A1* | 3/2023 | Sarda | H04L 7/0054 |
| | | | 375/355 |
| 2024/0430070 A1* | 12/2024 | Sarda | H04L 43/10 |

FOREIGN PATENT DOCUMENTS

| | | | |
|---|---|---|---|
| CN | 104378193 A | 2/2015 | |
| CN | 107294634 A | 10/2017 | |
| WO | WO 2015/003364 A1 | 1/2015 | |

OTHER PUBLICATIONS

Eidson, J., "IEEE-1588 Standard for a Precision Clock Synchronization Protocol for Networked Measurement and Control Systems," Agilent Technologies, 2005, 94 pages.

Gallant, D., "Practical Implementation of a IEEE 1588 Based Synchronization Distribution System," Silicon Laboratories, WSTS Jun. 19, 2018, 15 pages.

International Telecommunication Union, G.8273/Y.1368 (2018)— "Amendment 1, Framework of phase and time clocks", ITU-T, Mar. 2020 (Year 2020), 38 pages.

NXP Semiconductors, AN-12149, "Implementing an IEEE 1588 V2 on i.MX RT Using PTPd, FreeRTOS, and IwIP TCP/IP stack", Sep. 2018 (Year 2018), 28 pages.

Renesas, "Synchronization Management Unit," 8A34002 Datasheet, Renesas Electronics Corporation, Sep. 8, 2020, 107 pages.

Renesas, 82P33831, "Synchronization Management Unit for IEEE 1588 and 10G/40G/100G Synchronous Ethernet", Jul. 10, 2018 (Year 2018), 75 pages.

Renesas, AN-1033, "Delay Variation Measurement and Compensation", Application Note, Feb. 8, 2019 (Year: 2019), 13 pages.

Renesas, AN-950, "82P338XX/9XX Usage of a SYNC Input for Clock Alignment", Application Note, Nov. 10, 2016 (Year: 2016), 13 pages.

Silicon Labs, "UG103.05: IoT Endpoint Security Fundamentals," silabs.com, Rev. 1.2, downloaded Oct. 22, 2020, 12 pages.

Stanton, K., "802.1AS Tutorial", Intel Corporation, Nov. 13, 2008, 42 pages.

* cited by examiner

1588 Time Transfer

201 t1, t2, t3, t4 timestamps allows
calculation of
One-way Delay and Offset

203

$$\text{One-way Delay} = \frac{(t2 - t1) + (t4 - t3)}{2}$$

$$\text{Offset} = \frac{(t2 - t1) - (t4 - t3)}{2}$$

| GPS-PRI TOD |
| GPS-SEC TOD |
| eTOD_SEC TOD |
| eTOD_SYNC_ZDB TOD |
| HEARTBEAT TOD |

340

MAINTAINING A VIRTUAL TIME OF DAY

CROSS-REFERENCE TO RELATED APPLICATION(S)

This application is a continuation application of U.S. patent application Ser. No. 17/956,457, filed Sep. 29, 2022, entitled "MAINTAINING A VIRTUAL TIME OF DAY," which claims the benefit of U.S. Provisional Application No. 63/250,708, entitled "MAINTAINING A VIRTUAL TIME OF DAY," naming Vivek Sarda as inventor, filed on Sep. 30, 2021, and U.S. Provisional Application No. 63/347,788, entitled "MAINTAINING A VIRTUAL TIME OF DAY", naming Vivek Sarda as inventor, filed on Jun. 1, 2022, which applications are incorporated herein by reference.

BACKGROUND

Field of the Invention

This invention relates to network systems and more particularly to improving timing accuracy in network systems.

Description of the Related Art

Networks compliant with IEEE 1588 provide the backbone for 5G wireless applications and require precise time synchronization. Network communication systems use timing protocols to ensure time of day (ToD) counters in the network are synchronized. Synchronization (SYNC) signals are used to ensure that time of day counters update at the same time in the network. Any delay/offset and process, voltage, temperature (PVT) variation between the SYNC signals being supplied to the ToD counters in each line card in the network box results in an error that is classified as Continuous Time Error (CTE). 1588 networks specify the amount of error allowed. Any time error can result in packet loss or performance loss in real time applications like video streaming.

FIG. 1 shows a typical architecture of communication network system 100 with a slave line card (LC) 101, a master timing card (TC) 103, and multiple master line cards 105. The data_out 110 from each line card is time stamped using time stamps from local Time of Day (ToD) counters 111. In system 100, the ToD counters are external to the integrated circuit on which phase-locked loop (PLL) 121 is disposed. One challenge in the communication network system 100 is to keep the ToD counter on the slave line card aligned with the network timing associated with the incoming data stream on data_in 116. Another challenge is to maintain the ToD counters across different line cards in alignment over process, voltage, and temperature (PVT) variations so that all time stamps associated with data_out 110 are accurately aligned with each other and the incoming network time associated with data_in 116.

The master timing card 103 generates a synchronization (SYNC) signal and system clock signal (SYSCLK) using PLL 117 and dividers (not shown). The master timing card 103 supplies the SYSCLK and SYNC signal (shown as signals 107) to all of the line cards 101 and 105 over backplane 109. The SYNC signal is a global signal inside the network system box 100 that signifies the right moment/edge for the ToD counters 111 to rollover. The SYNC signal typically has a frequency range of 8 kHz to PP2S (pulse per 2 seconds). In many network systems the SYNC signal is a 1 pulse per second (1PPS) signal and in such network systems the SYNC signal indicates when the ToD should increment by one second. SYNC is an integer divided down and edge aligned version of the system clock signal SYSCLK. The various ToD counters 111 contain the same value and rollover at the same time based on the SYNC signal. Each of the line cards 101 and 105 generate the local SYNC signal by dividing the SYSCLK generated by PLL 121 in a divider (not shown in FIG. 1) to the desired frequency.

The exact position of the SYNC edge is derived using a precision time protocol (PTP) servo loop that uses the time information inside the incoming Synchronous Ethernet (SyncE) packet stream to the slave line card 101 on data in 116. FIG. 2 illustrates an example of a time stamp exchange 201 between an upstream PHY and the downstream PHY (e.g. PHY 123 in FIG. 1). Each of the time stamps t1-t4 represents the departure time (t1, t3) or the receive time (t2, t4). The timestamps exchange allows determination of one-way delay (OWD) and error offset between the upstream PHY and the downstream PHY shown at 203. That time stamp exchange allows the slave line card to determine the correct time provided by the upstream PHY even with delays between the upstream PHY and the downstream PHY. Note that the high level description of the PTP servo loop is provided as background information to provide context in which various embodiments described herein can be utilized.

The slave line card 101 and the master timing card 103 also have a closed loop PTP servo system in accordance with the IEEE 1588 protocol that corrects the position of the SYNC signal over process, voltage, and temperature (PVT) and aligns the SYNC signals distributed by the master timing card 103 to the timing of the incoming packet stream to the slave line card. The servo loop ensures that the slave line card and the master timing card are synchronized. The slave line card 101 and the master timing card 103 exchange information in the closed loop system to adjust the SYSCLK and SYNC pair on the master timing card such that the slave line card ToD is aligned with the network ToD of the chosen incoming data stream on data_in 116. The PTP servo loop adjusts the timing of SYNC by adjusting PLL 117 so that the slave line card ToD is aligned in frequency and phase to the upstream ToD received by the slave line card on data_in 116. The distributed SYSCLK is supplied as a reference clock to the PLL 121 within each of the line cards and the line card PLLs generate a local SYSCLK and SYNC signal that is phase and frequency aligned with the distributed SYSCLK and SYNC signal. The master line cards 105 are duplicates (up to 64 copies) of the slave line card 101 but without the closed loop PTP servo loop. In other words, the distribution of the CLK/SYNC pair to the master line cards 105 is open loop (without the PTP closed loop adjustments). The timing card and various line cards communicate, at least in part, utilizing a serial communication bus (not shown in FIG. 1) to transmit various status and configuration information.

As communication systems become faster and timing synchronization becomes more important, there is a need to improve timing accuracy within the system.

SUMMARY OF EMBODIMENTS OF THE INVENTION

Accordingly, in one embodiment a method for providing a time of day includes generating a heartbeat clock signal having a frequency higher than a synchronization signal, the synchronization signal indicative of when to increase a time of day by a predetermined increment. The method further includes time stamping the heartbeat clock signal to generate heartbeat time stamps associated with an internal time domain and determining the time of day value corresponding to an edge of a timing signal using one of the heartbeat time stamps and a time stamp of the timing signal and storing a time of day value in a time of day storage location, the time of day value being in a network time domain.

In another embodiment a line card for maintaining a time of day in a network communication system includes an oscillator to supply an oscillator output signal and a divider coupled to the oscillator output signal to divide the oscillator output signal and supply a heartbeat clock signal associated with an internal time domain. First time stamp logic time-stamps the heartbeat clock signal to generate heartbeat time stamps that are associated with the internal time domain. Second time stamp logic provides a timing signal time stamp for an edge of a timing signal, the timing signal stamp associated with the internal time domain. A time of day storage location stores a first time of day in a network time domain corresponding to the edge of the timing signal. The first time of day is generated using one of the heartbeat time stamps and the timing signal time stamp.

In another embodiment a network timing system includes a slave line card and a plurality of master line cards. A master timing card is communicatively coupled to supply a clock signal to the slave line card and the plurality of master line cards. The master timing card includes a first time of day register storing a first time of day value corresponding to a first edge of an internal clock signal and the master timing card includes a second time of day register storing a second time of day value corresponding to a second edge of an input clock signal.

In another embodiment a method for providing a time of day in a timing card of a network communications system includes storing a time of day in a time of day storage location. The method further includes generating a heartbeat clock signal having a frequency higher than a synchronization signal. The synchronization signal is indicative of when to increase the time of day by a predetermined increment. The heartbeat clock signal is time stamped to generate heartbeat time stamps.

In another embodiment a timing card in a network communication system includes a time of day storage location and a digitally controlled oscillator to supply an oscillator output signal. A divider is coupled to the oscillator output signal to divide the oscillator output signal and supply a heartbeat clock signal associated with an internal time domain and having a frequency higher than a synchronization signal indicative of when to increase the time of day by a predetermined increment. Time stamp logic timestamps the heartbeat clock signal to generate heartbeat time stamps. The time of day storage location is updated with an updated time of day for each occurrence of the heartbeat clock signal.

In another embodiment a line card includes a first clock source to supply a first timing signal. A second clock source is coupled to the first clock source and supplies a second timing signal used to time stamp a plurality of input signals. A plurality of time stampers are coupled to receive respective ones of the plurality of input signals and to generate the respective time stamp values corresponding to edges of the respective ones of the plurality of input signals. A plurality of time of day registers store respective time of day values corresponding to edges of respective ones of the plurality of input signals. The respective time stamp values are used to determine the respective time of day values for the plurality of input signals.

In another embodiment a method for generating time of day values includes time stamping edges of a plurality of input signals in time stampers and generating respective time stamp values corresponding to respective ones of the edges of the plurality of input signals. The method further includes storing the time of day values in respective time of day registers, the time of day values based on the time stamp values.

In another embodiment an apparatus for generating a plurality of time of day values includes a plurality of time stampers coupled to receive respective ones of the plurality of input signals and to generate the respective time stamp values corresponding to edges of the respective ones of the plurality of input signals. A plurality of time of day registers store respective ones of the time of day values corresponding to edges of respective ones of the plurality of input signals. The respective time stamp values are used to determine the respective time of day values for the plurality of input signals.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
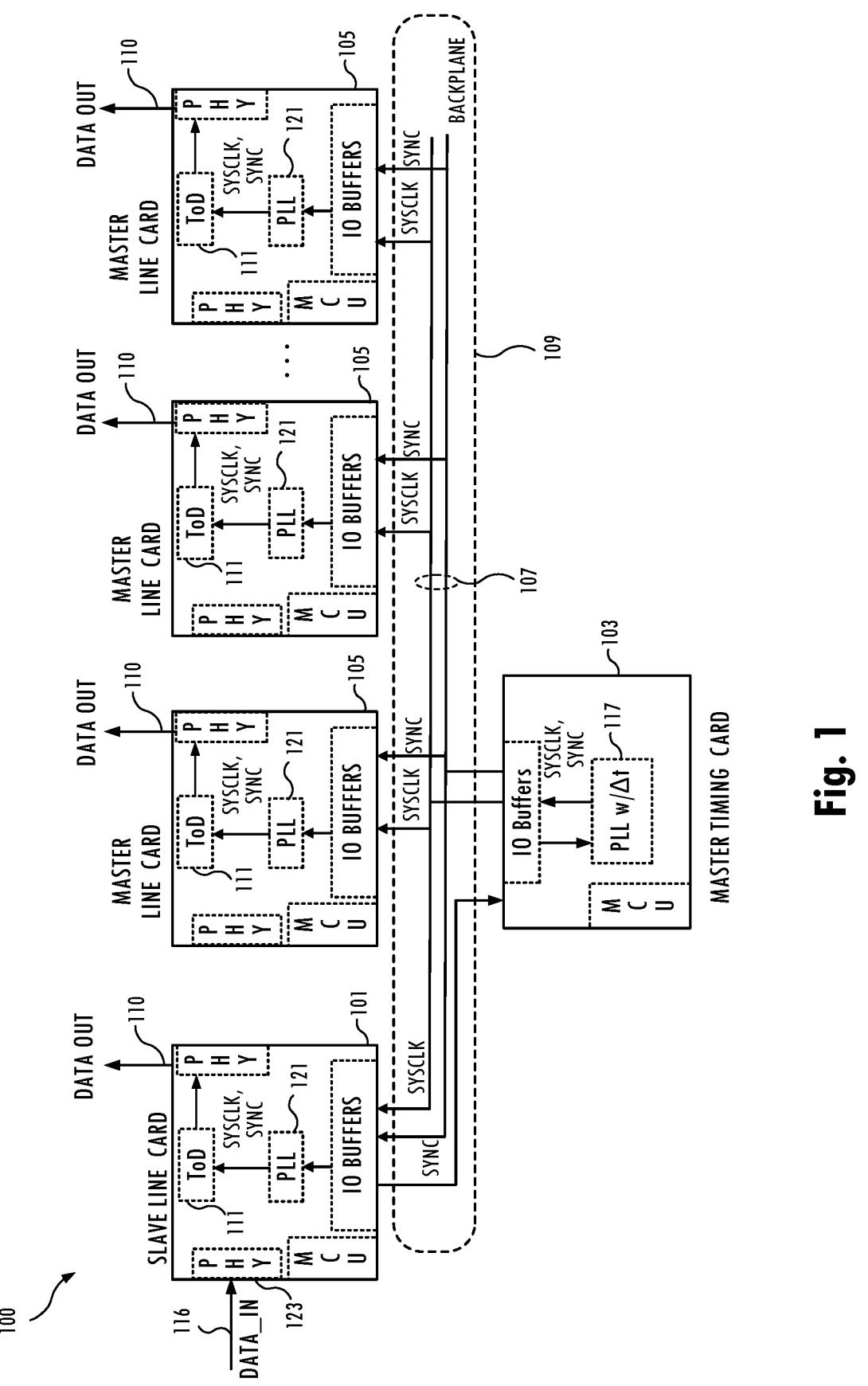
FIG. 1 illustrates a typical communication network system with a slave line card (LC), a master timing card (TC), and multiple master line cards coupled through a backplane.
Figure 2:
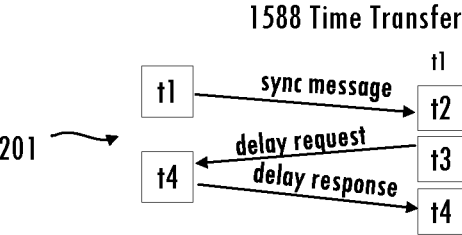
FIG. 2 illustrates an example of a time stamp exchange.
Figures 3, 4:
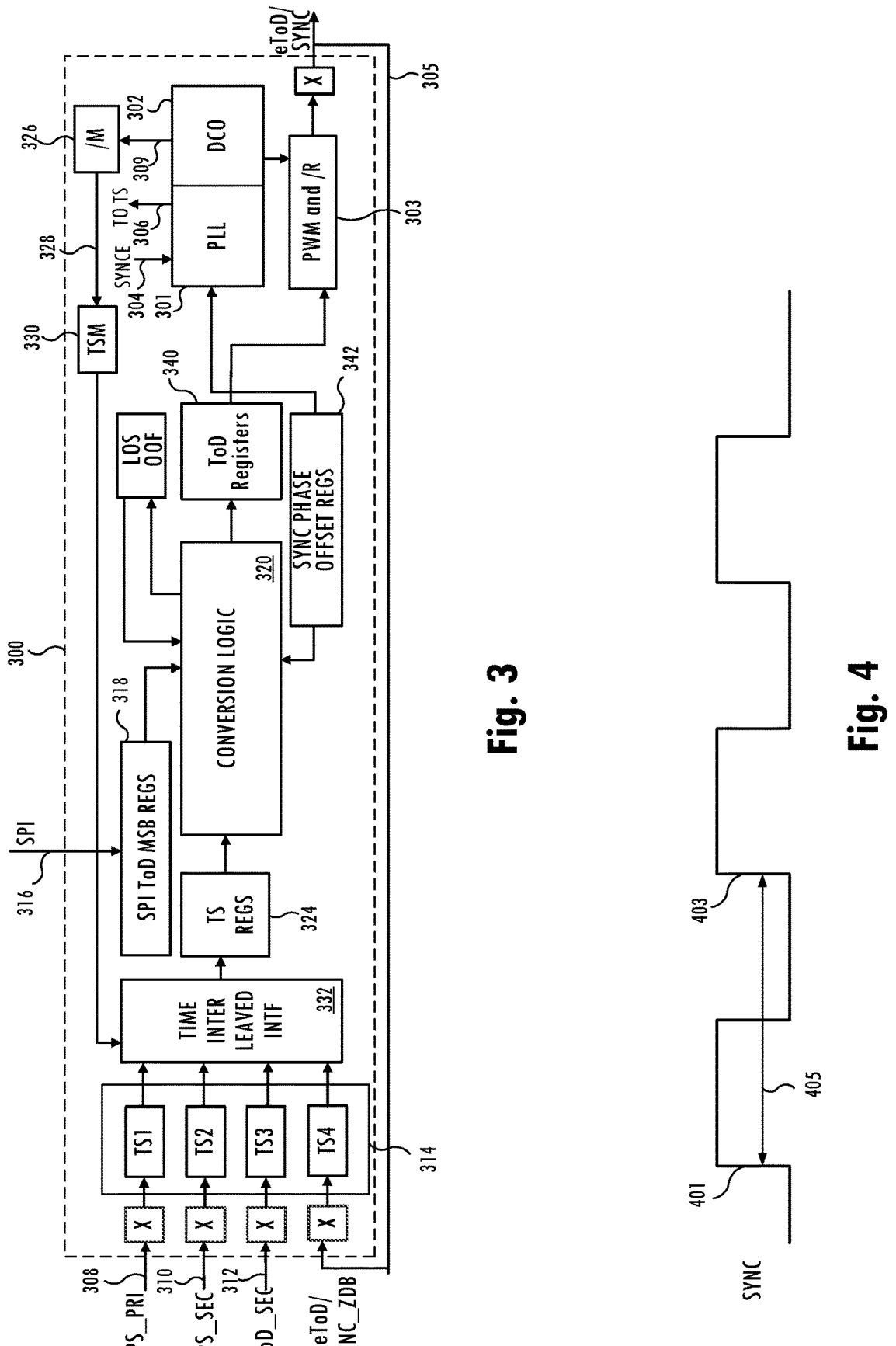
FIG. 3 illustrates an embodiment of integrated circuit that provides a plurality of virtual time of day values.
FIG. 4 illustrates how the conversion factor is determined at startup.

To improve system communications by increasing timing accuracy and flexibility embodiments emulate high speed counters utilizing a virtual time of day approach. Rather than using counters, time stamps are used to provide accurate time of day values without maintaining actual time of day counters. Referring to FIG. 3, integrated circuit 300 provides a plurality of time of day values as described further herein. In various embodiments, the integrated circuit 300 resides on the slave line card, the master line cards, and/or the master timing card. The integrated circuit 300 includes a PLL 301 and a digitally controlled oscillator (DCO) 302. In an embodiment, the DCO 302 receives an input signal from the voltage controlled oscillator (VCO) of the PLL. The PLL is locked to the system timing signal SYNCE signal 304 while the DCO is adjusted according to a PTP loop. Thus, there is a frequency difference between the VCO output 306 of the PLL and the DCO output 309 supplied to the/M divider 326 and the/R divider. A pulse width modulator (PWM) and divider logic 303 receives a DCO output and divides the DCO output in a counter R to generate a SYNC signal. The SYNC signal is used in various ways by the system depending on whether the integrated circuit 300 is on a master line card, a slave line card, or a master timing card. In an embodiment, with the integrated circuit on a master timing card, the SYNC signal is distributed to line cards as part of signals 107 (see FIG. 1) or a serial bus that 305 that combines the SYNC signal and SYSCLK into a pulse width modulated signal that can also provide information such as the time of day as well as other configuration and status information. Such a system is described in more detail in the U.S. Patent Application entitled "Data Protocol Over Clock Line", application Ser. No. 17/375,634, filed Jul. 14, 2021, naming Vivek Sarda as inventor, which application is incorporated herein by reference. The SYNC signal, as a separate signal, or encoded on the serial eToD/SYNC signal line 305 is fed back as an input to integrated circuit 300.

In the embodiment illustrated in FIG. 3, integrated circuit 300 receives four timing related signals through input terminals "X". Signal 308 is a global positioning system (GPS) primary signal. Signal 310 is a GPS secondary signal. The eToD signal 312 is a second source for the SYNC signal from, e.g., a backup timing card or the slave line card and eToD/SYNC_ZDB is the feedback 305 of eToD/SYNC. The ZDB indicates the signal is a zero delay buffer signal that accounts for the delay through integrated circuit 300 to help ensure that SYNC signals used by master line cards are synchronized.

All of the transitions (or at least one edge, e.g., the rising edge) of the input signals are time stamped by time stamper 314. Time stamper 314 is shown as having discrete time stamp logic TS1, TS2, TS3, and TS4 for each of the four inputs but substantial portions of the timestamp logic may be shared. The time stamper logic is described in additional detail herein. For now, it is sufficient to understand that the time stamper runs off an internal clock 306 derived from the VCO in PLL 301. In an embodiment the time stamper includes a time stamper counter that resets every 2 seconds. Note that there are at least two separate time domains of significance to the time stamp operation. One of the time domains is the local time domain associated with the DCO of the integrated circuit 300. The other time domain is the network time domain associated with the signals that are received by the integrated circuit 300. For example, the SYNC signal and the ToD are values in the network time domain. The time of day is in units of Coordinated Universal Time (UTC) time of seconds, nanoseconds, and picoseconds. The time stamps in local time need to be converted to UTC time in order to provide an accurate time of day. That requires a conversion factor, which is used by the conversion logic 320 to convert from internal time to network time.

FIG. 4 illustrates a way to determine the conversion factor at startup. Once the PLL 301 is locked to SYNCE 304 and thus the timing of integrated circuit 300 is stable, the first edge 401 of the SYNC signal is timestamped. Then the second edge 403 of the SYNC signal is time stamped and the first time stamp of edge 401 is subtracted from the second time stamp of edge 403. That provides the number of time stamps that occur between edges. Remember that the time stamp logic is running off of the PLL 301 VCO and the SYNC signal is running off of DCO 302. Assume the result is 5000 units of time stamp time are in one SYNC period

405. Assume also that the SYNC signal is a 1 PPS SYNC signal. That means each time stamp unit is (1 second/5000) or 200 μs. That provides the conversion factor to convert from the internal time domain to the network time domain. That is, each second of network time is 5000 time stamp units.

Figure 5:
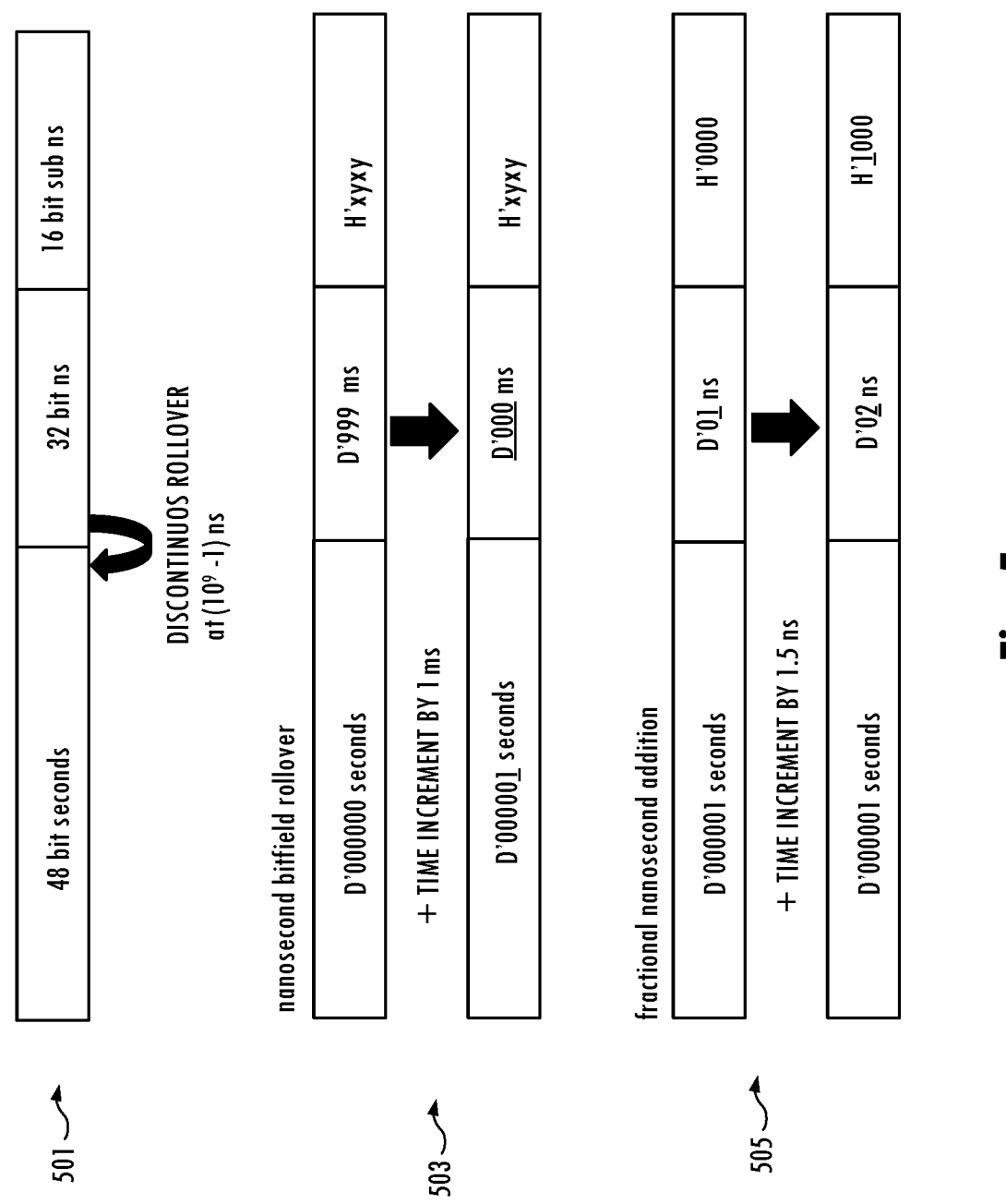
FIG. 5 illustrates an example of a virtual time of day register.

FIG. 5 shows a standardized International Atomic Time (TAI) format 501 for encoding time in the time of day registers. The format is 96 bits with a 48 bit seconds bitfield, a 32 bit nanoseconds bit field, and a 16 bit field for sub-nanoseconds. The time of day always increases monotonically in steady state operation. The 32-bit nanoseconds bitfield holds any value from 0 to $10^9-1$ ns. Rollover adds 1 into the seconds field when the nanoseconds bitfield is incremented from $10^9-1$, and the nanoseconds bitfield resets to 0. FIG. 5 illustrates the rollover at 503 from 999 ms when 1 ms is added and the ms field resets to 0, where "D" indicates a decimal value. Each bit of the 16-bit sub nanoseconds bitfield is ½ of the previous bit value (MSB→LSB) and thus the MSB=0.5 nanoseconds, LSB=15.2 femtoseconds. As shown at 505, where "H" indicates hexadecimal, an increase in 1.5 ns results in 2 ns in the nanosecond field and a "1" in the most significant bit of the sub ns bit field representing 0.5 ns.

The steady state time of day value is the sum of LSBs maintained by the integrated circuit 300 plus most significant bit (MSB) values initialized at startup from external sources. In the embodiment of FIG. 3, a serial bus such as a Serial Peripheral Interconnect (SPI) bus 316 (FIG. 3) initially provides the MSBs for the time of day register, which is stored in SPI MSB ToD registers 318. Once the time conversion factor is determined initially as described above, based on the number of time stamp units in a period of the SYNC signal, the LSBs of the time of day register are combined with the MSBs provided by the SPI bus to provide the time of day.

Figures 6, 7:
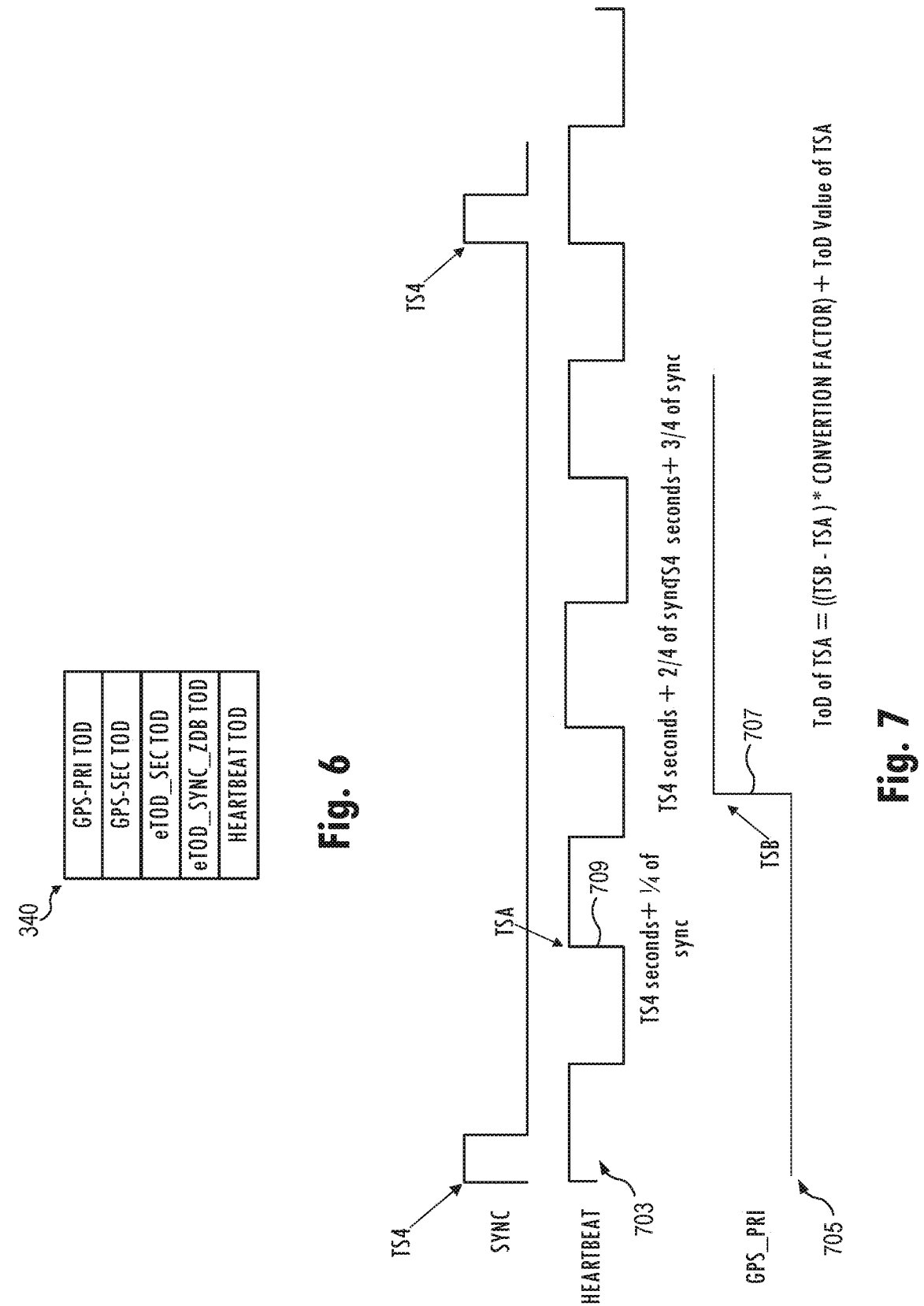
FIG. 6 illustrates a timing diagram showing how the occurrence of an edge of an input clock signal is converted to a ToD value.
FIG. 7 illustrates examples of ToD registers.

The timing integrated circuit 300 includes an M divider 326, which divides the DCO output signal by a value M to generate a heartbeat clock signal 328. That heartbeat clock signal is used in converting the occurrence of edges on the inputs to time of day values. Each time of day edge (or just rising of falling edge) is time stamped by time stamper 330. The time stamper runs off the PLL VCO derived signal 306 that is supplied to time stamper (TS) logic in the integrated circuit 300 while the M divider runs off the DCO 309. In addition, the time of day is updated for each heartbeat clock signal. Each heartbeat edge corresponds to a time period in real time. That time period is added to the previous base period to calculate the new ToD time and the corresponding internal time associated with the ToD time. For example, referring to FIG. 7, the simplified example shows each heartbeat period is one fourth of the period of the SYNC signal. Thus, for a 1 PPS SYNC signal, the heartbeat signal in the example of FIG. 7 is 0.25 seconds. That amount of time is added to the time of day register associated with the heartbeat signal. In an embodiment the conversion factor is also updated every heartbeat signal. The time stamp difference between the current heartbeat signal and the previous heartbeat signal may differ between heart beat signals. For example, assume the time stamp difference between adjacent heartbeat signals has been measured at 10 time stamp units and the next time stamp shows the time stamp difference is 11 time stamp units between the current time stamp unit and the immediately previous time stamp unit. That change is used to update the conversion factor. Referring to FIG. 4 again, that would be similar to the number of time stamp units changing from 5000 to 5001. Remember that the time stamp logic is running off the PLL VCO while the heartbeat signal is running off of the DCO signal. There are multiple sources for the conversion factor to change. One source is the change to the DCO based on the PTP loop. Another source is drift to the VCO due to, e.g., temperature, voltage, or aging of PLL 301. In other embodiments, the conversion factor for conversion logic 320 is updated less frequently, e.g., when the DCO is adjusted in the PTP loop or periodically during the SYNC period.

The heartbeat signal time stamped in the time stamper (TSM) 330 for the M divider along with the other time stamp values are supplied through an internal interface 332 to the time stamp registers 324. In an embodiment, the interface is time interleaved so one of the time stamp values is in on the bus at one time. In an embodiment, there are five time stamp registers in time stamp register 324, one for each input signal and one for the M divider time stamp. In other embodiments, other numbers of input signals are time stamped, some or all of which are converted to ToD values.

Referring to FIG. 6, shown is an example of the ToD registers 340 in FIG. 3. In an embodiment, the ToD registers 340 include separate ToD registers for the primary GPS signal GPS_PRI, the secondary GPS signal GPS_SEC, the secondary SYNC signal (eToD SEC), the primary SYNC signal (eToD/SYNC_ZDB), and the heartbeat signal. Note that while one register is shown for each of the clock inputs and the heartbeat signal, embodiments have multiple registers to store multiple time of day values for each type of ToD register. Having separate time of day registers for the various inputs allows for comparison of the occurrence of, e.g., the SYNC signal and the primary GPS signal and make sure they are properly synchronized. Note further that while described as registers that term is intended to be general and any suitable storage locations can be used to store the ToD values. As shown in FIG. 3, adjustments can be made by adjusting the conversion factor using the SYNC phase offset registers 342. In addition, the ability to compare secondary sources can be useful when a primary source fails. The secondary sources can be monitored and compared to the primary sources and/or to the SYNC signal using the ToD registers. Each rising edge (or falling edge or both) of the inputs is converted to a ToD value and used for synchronization. The loss of signal (LOS) and out of frequency (OOF) logic 350 also provide inputs to the conversion logic and receive converted values. The LOS/OOF logic informs the conversion logic 320 that the system is not operating at the expected frequencies and the addition of expected periods into the equations may cause incorrect answers. Conversely, when the conversion logic 320 sees a conversion factor that is out of reasonable bounds, it can inform the LOS/OOF that the internal voltage controlled oscillator of the PLL 301 to external SYNC frequency scale is out of bounds and hence there may be an error.

The heartbeat signals are also used to determine the time of occurrence of the other input signals, e.g., those input signals that are time stamped by time stampers T1 through T3. With reference to FIGS. 3 and 7, the time stamper TS4 timestamps the rising (and/or falling) edges of the SYNC signal. The TS4 time stamps are used to track any offset between TS4 and the internal ToD and in some cases, move the ToD based on the required offset. Note that embodiments use an internal path from the pin to the time stamper TS4 rather than using an external path. Some embodiments time stamp both a received SYNC signal on an input pin and a generated SYNC signal that is fed back on an external or internal path. For case of illustration assume the heartbeat signal 703 has a period that is one quarter of the period of the SYNC signal. Each edge (or at least rising edge) of the heartbeat signal is time stamped and the time stamps are saved. Note that the heartbeat signal from divider 326 and the SYNC signal from PWM and divider 303 are aligned and come from the DCO. Assume the GPS primary input 308 is shown at 705 and the rising edge of the GPS primary input occurs at 707. Each rising edge of the heartbeat clock signal 703 is time stamped in time stamper TSM 330 (see FIG. 3) and saved in time stamp registers 324. In addition, each heartbeat time stamp value is converted to a time of day value and used to update the heartbeat ToD register in ToD registers 340. For this example, the time stamp (TSA) of the rising edge of the heartbeat signal that occurs at 709 is the most recent available heartbeat timestamp before the rising edge of GPS_PRI at 707. Time stamper TS1 time stamps the rising edge 707 of the GPS_PRI clock signal that occurs at 707 resulting in timestamp TSB and TSB is saved in the time stamp registers 324 (see FIG. 3). As shown in FIG. 7, the time that the rising edge 707 occurs is converted to network time by determining a difference between the time stamps for rising edges 707 and 709 ((TSB-TSA), multiplying the difference by the conversion factor, and adding the converted difference to a ToD value corresponding to the rising edge 709 of the heartbeat signal. That math function can be part of the conversion logic 320 or separate logic. In embodiments, a programmed microcontroller performs the functions of the conversion logic and other calculations required to update time of day values.

Figure 8:
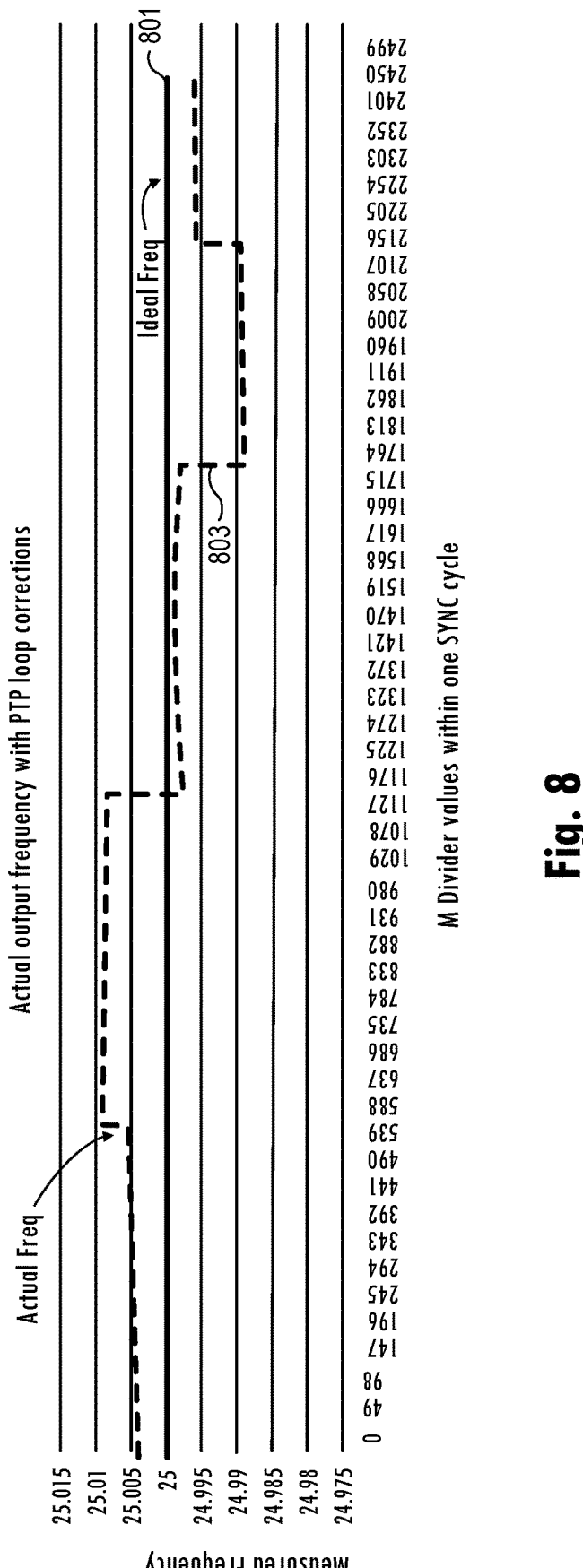
FIG. 8 illustrates how the frequency of the heartbeat signal varies during a SYNC cycle.

FIG. 8 illustrates that the frequency of the output signal shown as ideal frequency 801 associated with the PLL 301 in FIG. 3 changes during the SYNC period. As discussed above, the PTP loop keeps the master timing card and the slave line card synchronized. Thus, the DCO output signal in PLL 301 (FIG. 3) changes during the SYNC period to maintain synchronization with the network timing received at the slave line card. Thus, assume the heartbeat clock is nominally 1 MHz. With PTP corrections, the actual frequency 803 of the output signal varies during the SYNC period. The variations shown in FIG. 8 are exaggerated for ease of illustration. The conversion factor is adjusted each heartbeat signal. In the example of FIG. 8, there are 2500 heartbeat cycles per SYNC period. Each heartbeat cycle is a predetermined portion of the SYNC signal. For the example shown in FIG. 8, assume the SYNC period is 2500 $\mu$s. Each heartbeat cycle is 1 $\mu$s ($\frac{1}{2500}$). Each heartbeat edge adds 1 $\mu$s to the ToD, and thus 1 $\mu$s is added to the previous ToD value for the previous heartbeat ToD and the updated ToD is stored in the heartbeat ToD register as the ToD for the current heartbeat ToD value.

Figure 9:
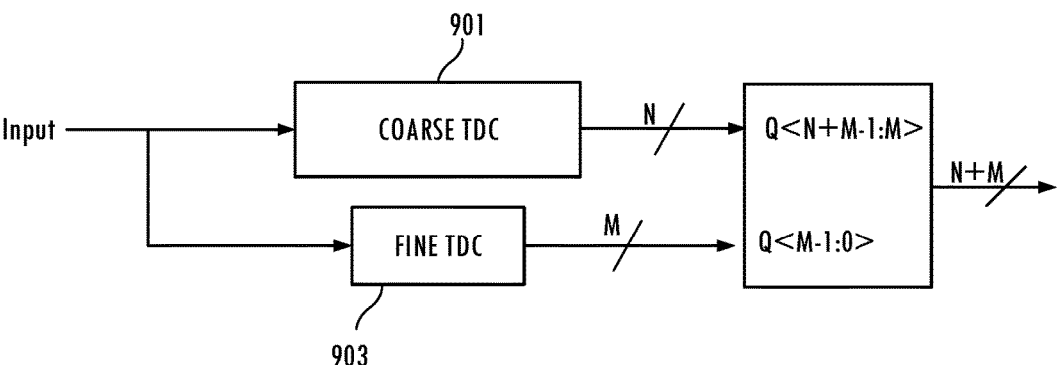
FIG. 9 illustrates a high level block diagram of time stamp logic utilized in embodiments.

FIG. 9 illustrates an embodiment high level diagram of a time to digital converter (TDC) that can be used as a time stamper in various embodiments described herein. TDCs often utilize 2-stages, a coarse TDC 901 and a fine TDC 903. The coarse TDC typically works with a time base set by a system clock. The coarse TDC generates an integer code of N course bits <N+M−1:M> and the fine TDC generates a fractional code of M bits <M−1:0>, which are combined to produce a result of N+M bits. The fine TDC is often based on a delay line using N elements with a unit delay associated with the length of time through one element. Other ways to implement the fine TDC are described in the U.S. Pat. No. 10,067,478 filed Dec. 11, 2017, naming Raghunandan Kolar Ranganathan as inventor, which patent is incorporated herein by reference. The overall resolution is determined by the fine TDC.

Figure 10:
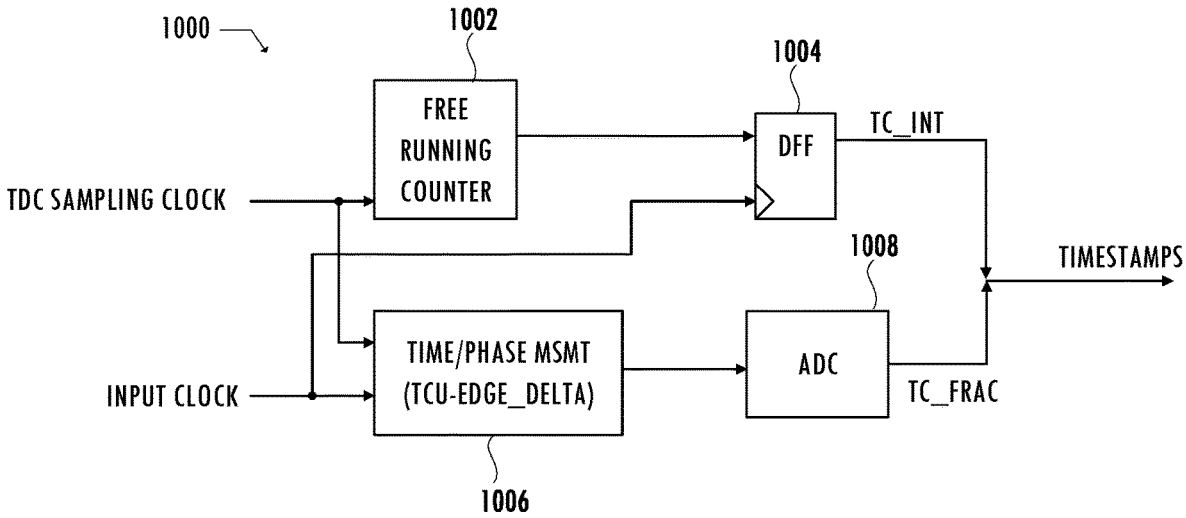
FIG. 10 illustrates another high level block diagram of time stamp logic utilized in embodiments.
Figure 10:
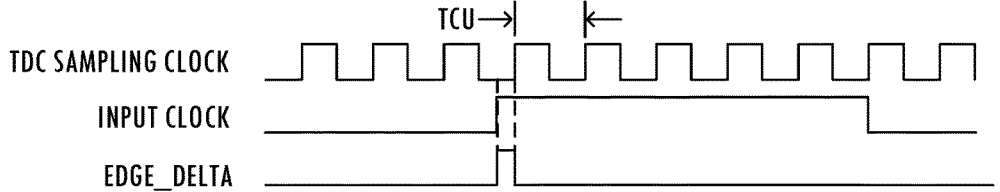

FIG. 10 illustrates another embodiment of a time-to-digital converter circuit that may be used in the time stamp logic. Time-to-digital converter 1000 generates an integer time code TC_INT and a fractional time code TC_FRAC that are combined at the output to generate output digital signal TIMESTAMPS based on clock signal INPUT CLOCK and clock signal TDC SAMPLING CLOCK. Clock signal TDC SAMPLING CLOCK controls free running counter 1002, which generates an output integer count signal that is synchronized to clock signal INPUT CLOCK by a storage element (e.g., D flip-flops 1004). The output of D flip-flops 204 is integer time code TC_INT, which indicates the integer number of full cycles of clock signal TDC SAMPLING CLOCK in a period of clock signal INPUT CLOCK.

Time/phase measurement circuit 1006 generates an indication of time difference EDGE_DELTA between edges of clock signal TDC SAMPLING CLOCK and clock signal INPUT CLOCK. That difference is digitized by analog-to-digital converter 1008, which provides a digital version of that difference as fractional time code TC_FRAC. In an embodiment, the fractional time code is a residue that can range from 0 to 1 unit interval (UI) of the sampling clock. Clock signal INPUT CLOCK has input frequency $$F_{in} = \frac{F_{ref}}{N + \alpha}; 0 \leq \alpha < 1,$$

where N corresponds to the integer number of the integer number of full cycles of clock signal TDC SAMPLING CLOCK in a period of clock signal INPUT CLOCK and α corresponds to the residue. The residue has a periodicity of $\alpha * F_{in}$ and is sampled at $F_{in}$.

Referring again to FIG. 3, the ToD value associated with TS4 (the SYNC signal) is provided to PWM and divider logic 303 and in an embodiment combined with the SYNC signal provided by divider R 303 and supplied as an external SYNC signal. In embodiments, the SYNC signal is provided for use by an external ToD counter without encoding with the SYSCLK using the PWM logic. Where the SYSLK signal is pulse width modulated to represent both the SYNC signal and other information such as ToD, the cToD/SYNC signal is decoded by a decoder (not shown in FIG. 3) before being time stamped by time stamper TS4. The pulse width modulation of SYSCLK is described in the Patent Application entitled "Data Protocol Over Clock Line", application Ser. No. 17/375,634, filed Jul. 14, 2021, naming Vivek Sarda as inventor, which application is incorporated herein by reference. The various time of day values stored in the time of day registers can be requested by external sources, e.g., from a processor located external to the integrated circuit 300 or can be supplied by the integrated circuit 300 to other line cards or backup timing cards as requested, e.g., over the SPI bus.

Figure 11:
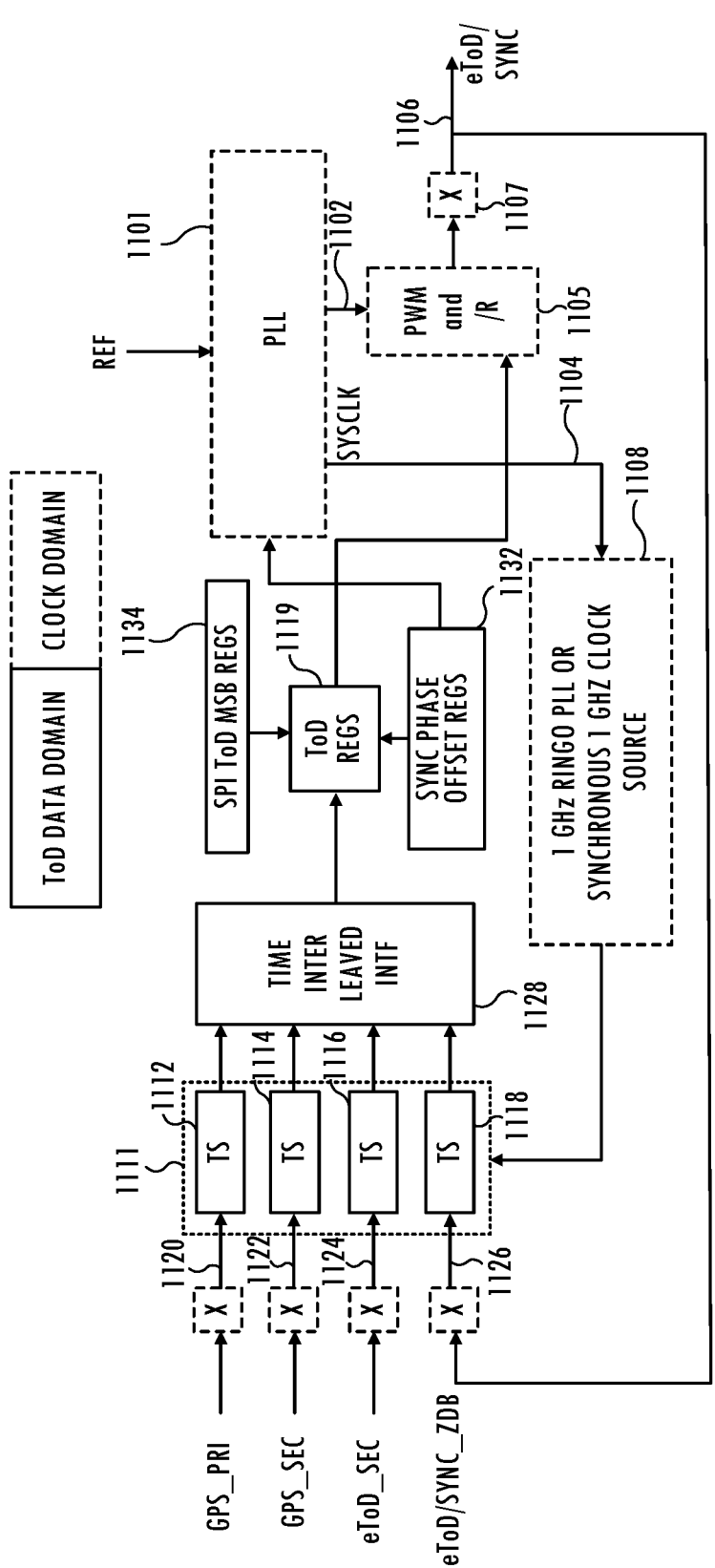
FIG. 11 illustrates a high level block diagram of an integrated circuit providing time of day values associated with edges of input signals in which the time stamps are performed in external UTC time.

FIG. 11 illustrates another embodiment in which the time stampers run on a clock source that is on a UTC time base (1 ns). PLL 1101 generates a timing signal 1102 that is supplied to the PWM and/R divider block to generate the PWM encoded SYSCLK signal, in which SYNC and other data such as ToD is encoded. The encoded SYSCLK is supplied to the eToD signal line 1106 through output terminal 1107. The SYSCLK 1104 (or SYNC signal) is supplied to the 1 GHZ oscillator 1108. Note that the timing signal 1102 and the SYSCLK 1104 may be the same signal or related. In an embodiment the SYSCLK is a 10 MHz signal. Other embodiments utilize a SYSCLK with a different frequency. In an embodiment, the oscillator 1108 is a ring oscillator but other embodiments use other oscillators including LC oscillators. The oscillator 1108 generates a 1 GHz signal 1110 used by the time stampers 1111, including time stampers 1112, 1114, 1116, 1118. Thus, the time stampers are already in UTC time base. The ToD registers 1119 store copies of time stamps for the various inputs, GPS_PRI 1120, GPS_SEC 1122, cToD_SEC 1124, and eToD/SYN-C_ZDB 1126 that are timestamped UTC time. In embodiments, all of the transitions (or at least one edge, e.g., the rising edge) of the input signals are time stamped by time stampers 1112, 1114, 1116, 1118. The time stamps indicate the time of day associated with the various input signals. Other embodiments time stamp additional inputs. The time stamps are supplied through a time interleaved interface 1128 to the ToD regsisters 1119. Note that no conversion is required between internal time and external network time since the time stampers are running on the UTC time base. The ToD registers can be adjusted by the phase offset registers 1132. The most significant bits of the time of day are supplied to the MSB registers 1134 from, e.g., an SPI bus. In an embodiment, the time stamper uses a physical counter running at 1 GHz in coarse mode with additional interpolation available in a fine mode with registers corresponding to the inputs to be time stamped. Thus, the use of two oscillators can allow UTC time base to be utilized. Note that there is still an internal clock domain denoted by dashed lines but no need to translate to external time due to the use of oscillator 1108.

Thus, various embodiments for providing time of day information have been described. The description of the invention set forth herein is illustrative, and is not intended to limit the scope of the invention as set forth in the following claims. Variations and modifications of the embodiments disclosed herein, may be made based on the description set forth herein, without departing from the scope of the invention as set forth in the following claims.

What is claimed is:

1. A method for providing time of day values in a network timing system, the method comprising:
    with circuitry of a master timing card of the network timing system, supplying a clock signal to a slave line card of the network timing system and a plurality of master line cards of the network timing system;
    in a first time of day register of the master timing card, storing a first time of day value corresponding to a first edge of an internal clock signal; and
    in a second time of day register of the master timing card, storing a second time of day value corresponding to a second edge of an input clock signal.

2. The method of claim 1 further comprising:
    in a first time stamp register, storing a first time stamp associated with the internal clock signal; and
    in a second time stamp register, storing a second time stamp associated with the input clock signal.

3. The method of claim 2 further comprising determining the second time of day value using a difference between the second time stamp and the first time stamp.

4. The method of claim 3 further comprising using a conversion factor to convert the difference from internal time associated with the internal clock signal to network time associated with the input clock signal.

5. A line card for maintaining a time of day in a network communication system, the line card comprising:
    time stamp circuitry configured to generate heartbeat time stamps associated with a heartbeat clock signal, to generate a timing signal time stamp of an edge of a timing signal, and to generate a first time stamp and a second time stamp of a synchronization signal, the synchronization signal indicative of when to increase a time of day; and conversion circuitry configured to generate a conversion factor to convert from an internal time domain to a network time domain using the first time stamp and the second time stamp; and time of day circuitry configured to generate a first time of day corresponding to the edge of the timing signal in a network time domain, the first time of day being generated using a heartbeat time stamp of the heartbeat time stamps, the timing signal time stamp, and the conversion factor.

6. The line card of claim 5 the time stamp circuitry further configured to provide a second timing signal time stamp for an edge of a second timing signal, and the time of day circuitry further configured to generate an updated time of day value in the network time domain indicative of when the edge of the second timing signal occurred.

7. The line card of claim 6 wherein the time of day circuitry is configured to generate the updated time of day value by determining a difference between a most recent heartbeat time stamp of the heartbeat time stamps and the second timing signal time stamp, converting the difference to the network time domain using the conversion factor to generate a converted difference, and adding the converted difference to a time of day value corresponding to the most recent heartbeat time stamp.

8. The line card of claim 5 wherein the conversion factor is updated each period of the heartbeat clock signal.

9. The line card of claim 5 wherein the conversion factor is updated by subtracting one of the heartbeat time stamps from an adjacent one of the heartbeat time stamps and supplying a subtraction result and dividing the subtraction result by a unit time.

10. The line card of claim 5 wherein the first time stamp and the second time stamp correspond to a beginning and end of a period of the synchronization signal.

11. The line card of claim 5 wherein the heartbeat clock signal has a frequency higher than the synchronization signal.

12. The line card of claim 5 further comprising a heartbeat time of day storage location that is updated with an updated time of day for each occurrence of the heartbeat clock signal.

13. A network timing system comprising:
a slave line card;
a plurality of master line cards; and
a master timing card communicatively coupled to supply a clock signal to the slave line card and the plurality of master line cards, the master timing card including circuitry configured to generate heartbeat time stamps associated with a heartbeat clock signal, to generate a timing signal time stamp of an edge of a timing signal, to generate a first time stamp and a second time stamp of a synchronization signal, the synchronization signal indicative of when to increase a time of day, to generate a conversion factor to convert from an internal time domain to a network time domain using the first time stamp and the second time stamp, and to generate a first time of day corresponding to the edge of the timing signal in a network time domain, the first time of day being generated using a heartbeat time stamp of the heartbeat time stamps, the timing signal time stamp, and the conversion factor.

14. The network timing system of claim 13 wherein the conversion factor is updated each period of the heartbeat clock signal.

15. The network timing system of claim 13 wherein the conversion factor is updated by subtracting one of the heartbeat time stamps from an adjacent one of the heartbeat time stamps and supplying a subtraction result and dividing the subtraction result by a unit time.

16. The network timing system of claim 13 wherein the first time stamp and the second time stamp correspond to a beginning and end of a period of the synchronization signal.

17. The network timing system of claim 13 wherein the circuitry is further configured to provide a second timing signal time stamp for an edge of a second timing signal, and is further configured to generate an updated time of day value in the network time domain indicative of when the edge of the second timing signal occurred.

18. The network timing system of claim 17 wherein the circuitry is configured to generate the updated time of day value by determining a difference between a most recent heartbeat time stamp and the second timing signal time stamp, converting the difference to the network time domain using the conversion factor to generate a converted difference, and adding the converted difference to a time of day value corresponding to the most recent heartbeat time stamp.

* * * * *